United States Patent
Ying et al.

(10) Patent No.: US 12,404,375 B2
(45) Date of Patent: Sep. 2, 2025

(54) PREPARATION METHOD FOR WATER-LOSS-RESISTANT IONIC CONDUCTIVE GELATIN HYDROGEL

(71) Applicant: ZHEJIANG UNIVERSITY, Zhejiang (CN)

(72) Inventors: Yibin Ying, Zhejiang (CN); Lingyi Lan, Zhejiang (CN); Jianfeng Ping, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 19/075,743

(22) Filed: Mar. 10, 2025

(65) Prior Publication Data

US 2025/0206894 A1 Jun. 26, 2025

Related U.S. Application Data

(63) Continuation of application No. PCT/CN2023/104863, filed on Jun. 30, 2023.

(30) Foreign Application Priority Data

Mar. 27, 2023 (CN) .......................... 202310306253.0

(51) Int. Cl.
*C08J 3/075* (2006.01)
*C08K 5/3415* (2006.01)

(52) U.S. Cl.
CPC ............. *C08J 3/075* (2013.01); *C08K 5/3415* (2013.01); *C08J 2389/00* (2013.01)

(58) Field of Classification Search
CPC .............................. C08J 3/075; C08K 5/3415
See application file for complete search history.

(56) References Cited

U.S. PATENT DOCUMENTS

2010/0221306 A1* 9/2010 Tsujihata ................. A61K 8/06
424/443

FOREIGN PATENT DOCUMENTS

| CN | 107043465 | 8/2017 |
|---|---|---|
| CN | 110078945 | 8/2019 |
| CN | 110655663 | 1/2020 |
| CN | 115703888 | 2/2023 |
| CN | 116284863 | 6/2023 |
| CN | 116675944 | 9/2023 |

(Continued)

OTHER PUBLICATIONS

Machine translation of CN 115703888 A (Year: 2023).*

(Continued)

*Primary Examiner* — Christina H.W. Rosebach
(74) *Attorney, Agent, or Firm* — JCIPRNET

(57) ABSTRACT

Disclosed in the present invention is a preparation method for a water-loss-resistant ionic conductive gelatin hydrogel, including: adding a gelatin into deionized water for soaking and swelling, and then placing the gelatin in a water bath and carrying out magnetic stirring to obtain a gelatin solution; adding sodium pyrrolidone carboxylate into the gelatin solution to carry out treatment to obtain a gelatin-sodium pyrrolidone carboxylate mixed solution; and cooling the gelatin-sodium pyrrolidone carboxylate mixed solution at a certain temperature to obtain a gelatin-sodium pyrrolidone carboxylate hydrogel.

5 Claims, 2 Drawing Sheets

(56) References Cited

FOREIGN PATENT DOCUMENTS

WO    2022265182    12/2022

OTHER PUBLICATIONS

Mushtaq, F. et al. Preparation, properties, and applications of gelatin-based hydrogels (GHs) in the environmental, technological, and biomedical sectors. International Journal of Biological Macromolecules 218 (2022) 601-633 (Year: 2022).*

Lan, L. et al. Skin-Inspired All-Natural Biogel for Bioadhesive Interface. Adv. Mater. 2024, 36, 2401151 (Year: 2024).*

Lingyi Lan et al., "Skin-Inspired All-Natural Biogel for Bioadhesive Interface", Advanced Materials, Apr. 1, 2024, pp. 1-11, vol. 36, Issue 25.

"International Search Report (Form PCT/ISA/210) of PCT/CN2023/104863," mailed on Dec. 11, 2023, with English translation thereof, pp. 1-7.

* cited by examiner

PREPARATION METHOD FOR WATER-LOSS-RESISTANT IONIC CONDUCTIVE GELATIN HYDROGEL

CROSS-REFERENCE TO RELATED APPLICATION

This application is a continuation of international application of PCT application serial no. PCT/CN2023/104863 filed on Jun. 30, 2023, which claims the priority benefit of China application no. 202310306253.0 filed on Mar. 27, 2023. The entirety of each of the abovementioned patent applications is hereby incorporated by reference herein and made a part of this specification.

BACKGROUND

Technical Field

The invention relates to a preparation method for a hydrogel in the field of polymer preparation, and specifically relates to a preparation method for preparing a water-loss-resistant ionic conductive gelatin hydrogel.

Description of Related Art

Hydrogel is a polymer exhibiting a three-dimensional network structure and containing a large number of water molecules. In recent years, due to its excellent flexibility, elasticity, and bio-compatibility, hydrogel has been widely applied in various fields. Gelatin is a natural polymer extracted from animal connective tissues (such as skin, bones, and cartilage). It is mainly composed of collagen protein and is a complex macromolecular polypeptide, primarily containing a trimer formed by three helical collagen protein chains. Gelation is one of the important characteristics of gelatin. After a hot gelatin solution is cooled, gelatin undergoes gelation due to conformational changes in its molecular chains. Accordingly, a gelatin hydrogel is formed.

Such gelation properties of the gelatin solution, which undergoes phase transition with temperature, enables a wide range of application. In many applications, gelatin hydrogels are required to exhibit ionic conductivity. Currently, a common method is to add inorganic salts, such as potassium chloride or sodium chloride, to the gelatin solution to enhance its ionic conductivity properties.

However, when gelatin hydrogel is exposed to air for an extended period, it may inevitably lose water, leading to mechanical hardening while also blocking the transfer of ions in the hydrogel. As a result, the gelatin hydrogel loses the original mechanical properties and ionic conductivity, failing to meet the requirements for long-term stable use.

Therefore, preparing a bio-compatible gelatin hydrogel that simultaneously possesses water-loss-resistant properties and ionic conductivity properties is a major challenge currently existing.

SUMMARY

Regarding the aforementioned issues, the invention provides a simple and easily implementable preparation method for a gelatin/sodium pyrrolidone carboxylate conductive hydrogel. The method is simple to operate, and the prepared hydrogel simultaneously possesses elasticity, extensibility, conductivity, and water-loss-resistant properties, overcoming the characteristics of poor conductivity and easy water loss of conventional hydrogels.

The technical solution of the invention is as follows:

Step 1: placing a predetermined amount of gelatin in a container and adding deionized water, that is, soaking the gelatin in the deionized water so that the gelatin swells for a predetermined period of time, and causing the gelatin to swell and place the gelatin in a water path and performing stirring with a magnetic force in a water bath at a predetermined temperature for a predetermined period of time to obtain a gelatin solution;

Step 2: obtaining a gelatin-sodium pyrrolidone carboxylate mixed solution in a process of adding sodium pyrrolidone carboxylate to the gelatin solution; and Step 3: pouring the gelatin-sodium pyrrolidone carboxylate mixed solution into a mold to be cooled at a predetermined temperature for a predetermined period of time to obtain the water-loss-resistant ionic conductive gelatin hydrogel.

In Step 1, a concentration of the gelatin after the deionized water is added is 15 wt % to 20 wt %, a soaking period of time of the gelatin is 30 minutes to 60 minutes, a water bath temperature is 50° C. to 55° C., and a stirring period of time is 60 minutes to 120 minutes.

In Step 2, a sodium pyrrolidone carboxylate solution is added to the gelatin solution, then a mixed solution is placed in a water bath at a predetermined temperature and stirred with magnetic force for a period of time to obtain the gelatin-sodium pyrrolidone carboxylate mixed solution.

In Step 2, a concentration of the sodium pyrrolidone carboxylate in the gelatin-sodium pyrrolidone carboxylate mixed solution is 0 wt % to 40 wt %, the temperature of the water bath is 50° C. to 55° C., and the period of time for stirring is 60 minutes to 120 minutes.

In Step 3, a cooling temperature is 10° C. to 20° C., and the period of time for cooling is 60 minutes to 120 minutes.

In the hydrogel of the invention, gelatin serving as a skeleton, water serving as a solvent, and sodium pyrrolidone carboxylate serving as a substance for improving the water loss resistance of the hydrogel and improving the ionic conductivity are added into a system, so that the mechanical property of the hydrogel is improved.

Sodium pyrrolidone carboxylate (i.e., PCA-Na) is a substance naturally present in the stratum corneum of the skin, an amino acid derivative and a natural moisturizing factor. The molecular structure of PCA-Na contains a pyrrolidone ring and a carboxylic acid functional group.

PCA-Na possesses extremely strong hygroscopicity and may absorb water of several hundred times of its own weight. Therefore, the moisturizing function is excellent. By adding PCA-Na as a bio-compatible liquid, the gel may form a large amount of hydrogen bonds with water molecules in the gelatin hydrogel, thereby slowing the evaporation of water molecules in the hydrogel and moisturizing the gelatin hydrogel. Furthermore, the carboxylic acid functional group in PCA-Na may form an ionic crosslink with an amino group on the gelatin molecular chain, and the electrostatic interaction between the two groups can greatly enhance the mechanical strength of the gelatin hydrogel. In addition, the sodium ions in PCA-Na molecules may move freely within the hydrogel network, endowing the hydrogel with excellent ionic conductivity.

Therefore, the preparation method proposed by the invention improves the drawbacks of gelatin hydrogels such as easy water loss, poor mechanical properties, and inadequate ionic conductivity, and is capable of providing a water-loss-resistant ionic conductive gelatin hydrogel.

The beneficial effects of the invention include:
(1) adding PCA-Na forms strong hydrogen bonds with water molecules, achieves a moisturizing effect, while also improves the mechanical strength and ionic conductivity of the gelatin hydrogel;
(2) the preparation method of the invention is simple, low-cost, highly practical, and easy to be applied widely.

DESCRIPTION OF THE EMBODIMENTS

Figure 1:
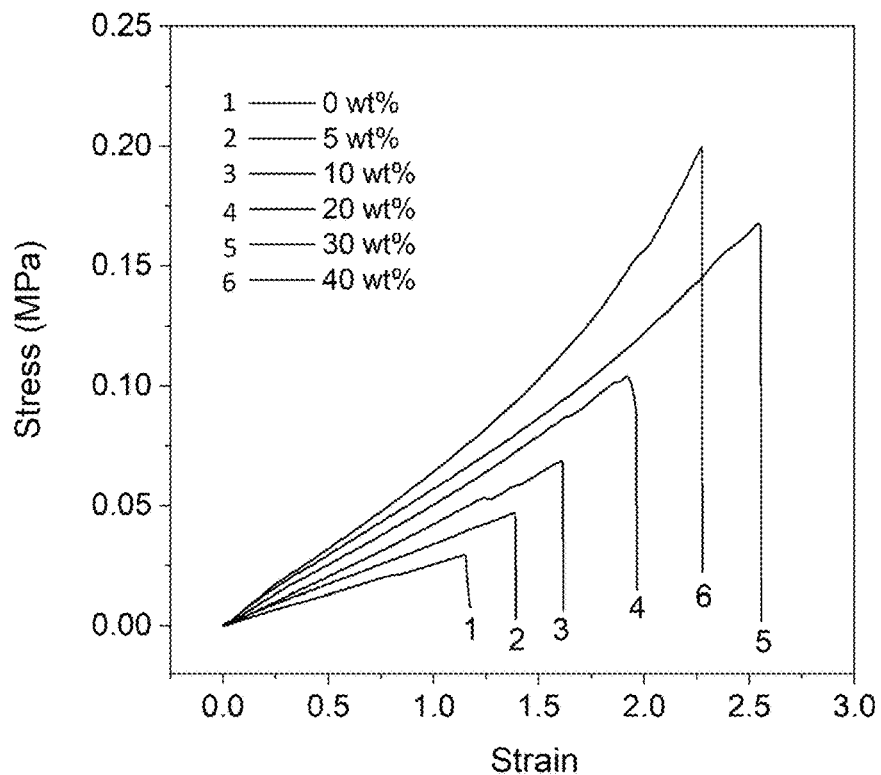
FIG. 1 shows a stress-strain diagram of hydrogels with different PCA-Na contents, where 0 wt % to 40 wt % represent the contents of PCA-Na in the system.

The following further explains the invention in combination with the accompanying drawings and specific embodiments.

The examples of the invention are as follows.

Example 1

0.4 g of gelatin was added to 1.88 mL of deionized water and soaked for one hours, and then stirring was performed at 50° C. for 2 hours to form a uniform gelatin solution; 0.12 g of sodium pyrrolidone carboxylate (PCA-Na) was added to the uniform gelatin solution, and then stirring was performed at 50° C. for 2 hours to form a gelatin-sodium pyrrolidone carboxylate mixed solution; the gelatin-sodium pyrrolidone carboxylate mixed solution was poured into a mold, and cooled at 20° C. for 1 hour to obtain the water-loss-resistant ionic conductive gelatin hydrogel.

Example 2

0.4 g of gelatin was added to 1.76 mL of deionized water and soaked for one hours, and then stirring was performed at 50° C. for 2 hours to form a uniform gelatin solution; 0.24 g of sodium pyrrolidone carboxylate (PCA-Na) was added to the uniform gelatin solution, and then stirring was performed at 50° C. for 2 hours to form a gelatin-sodium pyrrolidone carboxylate mixed solution; the gelatin-sodium pyrrolidone carboxylate mixed solution was poured into a mold, and cooled at 20° C. for 1 hour to obtain a water-loss-resistant ionic conductive gelatin hydrogel.

Example 3

0.4 g of gelatin was added to 1.52 mL of deionized water and soaked for one hours, and then stirring was performed at 50° C. for 2 hours to form a uniform gelatin solution; 0.48 g of sodium pyrrolidone carboxylate (PCA-Na) was added to the uniform gelatin solution, and then stirring was performed at 50° C. for 2 hours to form a gelatin-sodium pyrrolidone carboxylate mixed solution; the gelatin-sodium pyrrolidone carboxylate mixed solution was poured into a mold, and cooled at 20° C. for 1 hour to obtain a water-loss-resistant ionic conductive gelatin hydrogel.

Example 4

0.4 g of gelatin was added to 1.28 mL of deionized water and soaked for one hours, and then stirring was performed at 50° C. for 2 hours to form a uniform gelatin solution; 0.72 g of sodium pyrrolidone carboxylate (PCA-Na) was added to the uniform gelatin solution, and then stirring was performed at 50° C. for 2 hours to form a gelatin-sodium pyrrolidone carboxylate mixed solution; the gelatin-sodium pyrrolidone carboxylate mixed solution was poured into a mold, and cooled at 20° C. for 1 hour to obtain a water-loss-resistant ionic conductive gelatin hydrogel.

Example 5

0.4 g of gelatin was added to 1.04 mL of deionized water and soaked for one hours, and then stirring was performed at 50° C. for 2 hours to form a uniform gelatin solution; 0.96 g of sodium pyrrolidone carboxylate (PCA-Na) was added to the uniform gelatin solution, and then stirring was performed at 50° C. for 2 hours to form a gelatin-sodium pyrrolidone carboxylate mixed solution; the gelatin-sodium pyrrolidone carboxylate mixed solution was poured into a mold, and cooled at 20° C. for 1 hour to obtain a water-loss-resistant ionic conductive gelatin hydrogel.

Comparative Example 1

0.4 g of gelatin was added to 2 mL of deionized water and soaked for one hours, and then stirring was performed at 50° C. for 2 hours to form a uniform gelatin solution; the solution was poured into a mold, and cooled at 20° C. for 1 hour to obtain a gelatin hydrogel.

Examples 1 to 5 and Comparative Document 1 underwent multiple tests to obtain results in various aspects such as stress-strain, complex viscosity, electrical conductivity, water retention, etc., as shown in FIG. 1 to FIG. 4.

In each figure, 0% PCA-Na refers to Comparative Example 1, while the mass content of PCA-Na in Examples 1 to 5 increased successively, being 5%, 10%, 20%, 30%, and 40% respectively.

The stress-strain results obtained by testing Examples 1-5 and Comparative Example 1 are shown in FIG. 1. As can be observed from the figure, as PCA-Na content increases, the Young's modulus of the hydrogel increases.

Figure 2:
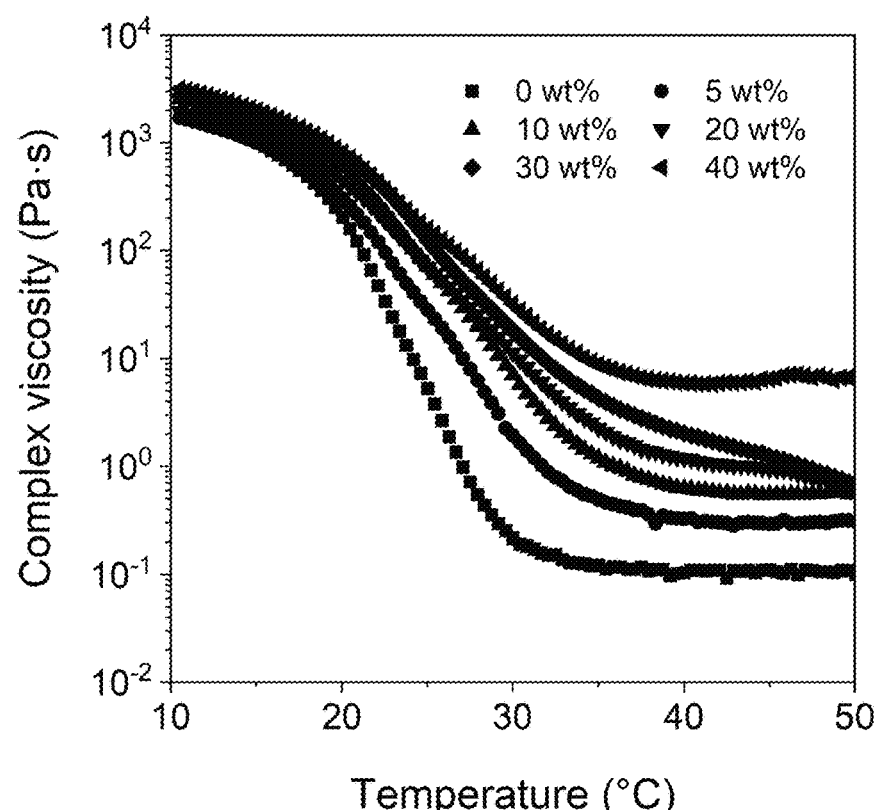
FIG. 2 shows a curvature diagram in which the complex viscosities of hydrogels with different PCA-Na contents change with temperature, where 0% to 40% represent the contents of PCA-Na in the system.

The results of complex viscosity changing with temperature as obtained by testing Examples 1-5 and Comparative Document 1 are shown in FIG. 2. As observed from the figure, as the PCA-Na content increases, the viscosity of the hydrogel increases.

Figure 3:
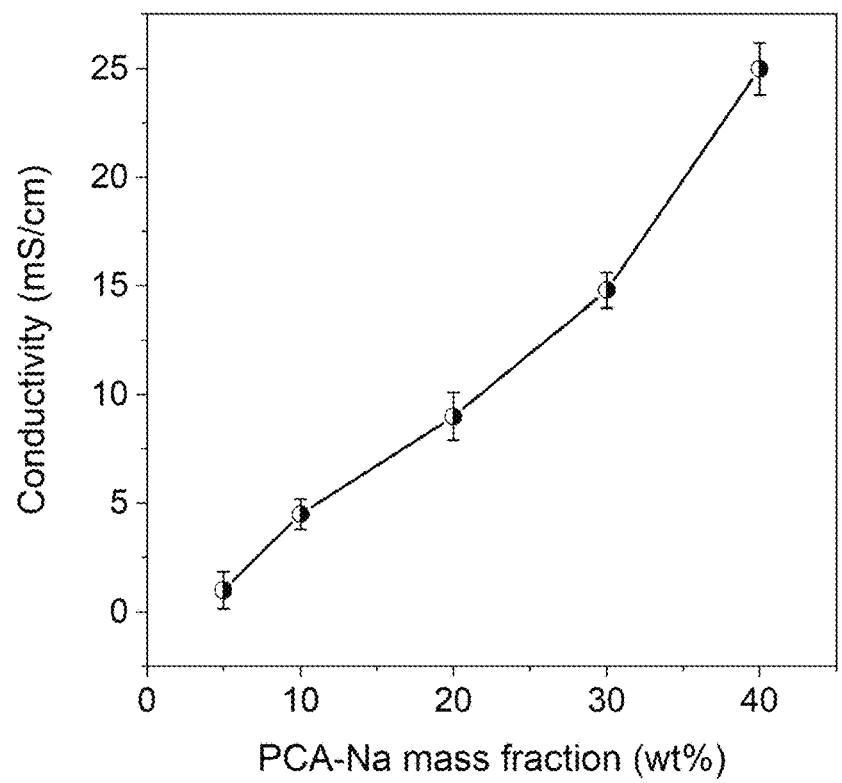
FIG. 3 shows a conductivity diagram of hydrogels with different PCA-Na contents.

The conductivity results obtained by testing Examples 1-5 and Comparative Example 1 are shown in FIG. 3. As can be observed from the figure, as PCA-Na content increases, the conductivity of the hydrogel increases.

Figure 4:
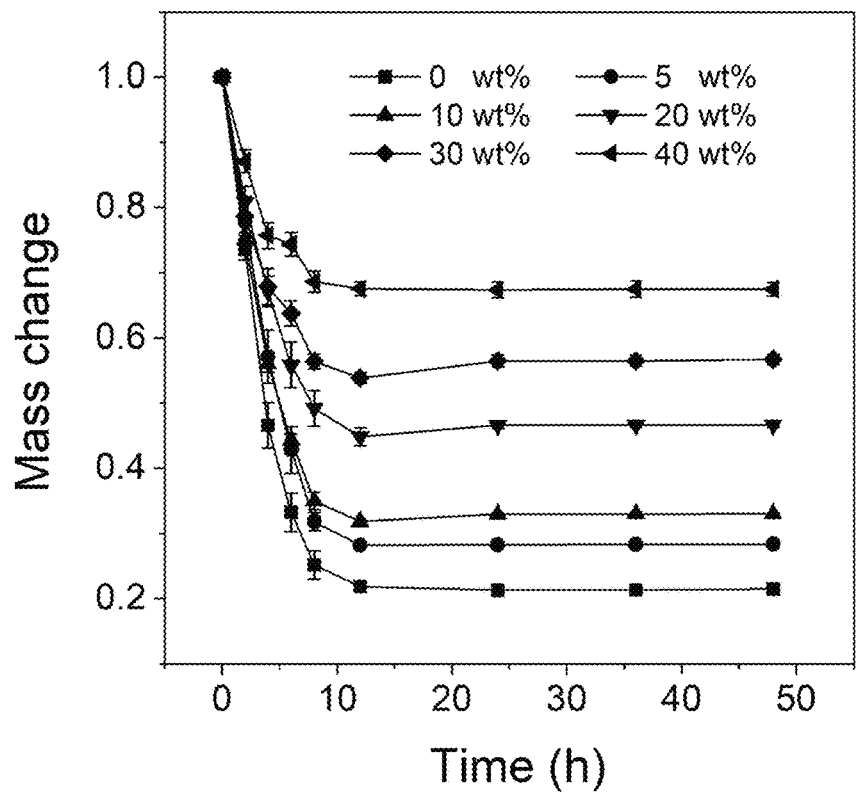
FIG. 4 shows a water retention diagram of hydrogels with different PCA-Na contents, where 0% to 40% represents the contents of PCA-Na in the system.

The water retention results obtained by testing Examples 1-5 and Comparative Example 1 are shown in FIG. 4. As can be observed from the figure, as PCA-Na content increases, the water retention of the hydrogel is enhanced.

As can be seen from the examples, by adding sodium pyrrolidone carboxylate, the invention may improve the water-loss resistance properties of the gel, provide a substance with ionic conductivity properties to be added into the system, and improve the mechanical properties of the hydrogel.

It should be noted that the above-mentioned examples are merely preferred examples of the invention and are not intended to limit the invention. Although the invention has been described in detail with reference to the preceding examples, those skilled in the field may still modify the technical solutions recorded in the preceding examples or make equivalent replacements to parts thereof. Any modifications, equivalent replacements, improvements, etc., made within the spirit and principles of the invention should be included within the claimed scope of the invention.

What is claimed is:

1. A preparation method for water-loss-resistant ionic conductive gelatin hydrogel, wherein the preparation method comprising steps and conditions as follows:
   - Step 1: adding a predetermined amount of gelatin to deionized water, that is, soaking the gelatin in the deionized water so that the gelatin swells for a predetermined period of time, and causing the gelatin to swell and place the gelatin in a water bath and performing stirring with a magnetic force in the water bath at a predetermined temperature for a predetermined period of time to obtain a gelatin solution;
   - Step 2: obtaining a gelatin-sodium pyrrolidone carboxylate mixed solution in a process of adding sodium pyrrolidone carboxylate to the gelatin solution; and
   - Step 3: pouring the gelatin-sodium pyrrolidone carboxylate mixed solution into a mold to be cooled at a predetermined temperature for a predetermined period of time to obtain the water-loss-resistant ionic conductive gelatin hydrogel.

2. The preparation method for the water-loss-resistant ionic conductive gelatin hydrogel according to claim 1, wherein, in the Step 1, a concentration of the gelatin after the deionized water is added is 15 wt % to 20 wt %, a soaking period of time of the gelatin is 30 minutes to 60 minutes, a water bath temperature is 50° C. to 55° C., and a stirring period of time is 60 minutes to 120 minutes.

3. The preparation method for the water-loss-resistant ionic conductive gelatin hydrogel according to claim 1, wherein, in the Step 2, a sodium pyrrolidone carboxylate solution is added to the gelatin solution, then a mixed solution is placed in a water bath at a predetermined temperature and stirred with magnetic force for a period of time to obtain the gelatin-sodium pyrrolidone carboxylate mixed solution.

4. The preparation method for the water-loss-resistant ionic conductive gelatin hydrogel according to claim 3, wherein, in the Step 2, a concentration of the sodium pyrrolidone carboxylate in the gelatin-sodium pyrrolidone carboxylate mixed solution is 5 wt % to 40 wt %, the temperature of the water bath is 50° C. to 55° C., and the period of time for stirring is 60 minutes to 120 minutes.

5. The preparation method for the water-loss-resistant ionic conductive gelatin hydrogel according to claim 1, wherein, in the Step 3, a cooling temperature is 10° C. to 20° C., and the period of time for cooling is 60 minutes to 120 minutes.

* * * * *